United States Patent
Zhang

(10) Patent No.: US 8,014,400 B2
(45) Date of Patent: Sep. 6, 2011

(54) METHOD FOR ALLOCATING DATA PACKET TRANSMISSION AMONG MULTIPLE LINKS OF A NETWORK, AND NETWORK DEVICE AND COMPUTER PROGRAM PRODUCT IMPLEMENTING THE METHOD

(75) Inventor: Fan Zhang, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 656 days.

(21) Appl. No.: 11/837,367

(22) Filed: Aug. 10, 2007

(65) Prior Publication Data

US 2009/0041015 A1    Feb. 12, 2009

(51) Int. Cl.
*H04L 12/56* (2006.01)

(52) U.S. Cl. ........................................... 370/392

(58) Field of Classification Search .............. 370/394, 370/229–238; 709/231, 238
See application file for complete search history.

(56) References Cited

U.S. PATENT DOCUMENTS

| | | | | |
|---|---|---|---|---|
| 5,548,639 | A * | 8/1996 | Ogura et al. | 379/221.04 |
| 5,812,528 | A * | 9/1998 | VanDervort | 370/235 |
| 6,215,774 | B1 * | 4/2001 | Knauerhase et al. | 370/252 |
| 6,222,837 | B1 * | 4/2001 | Ahuja et al. | 370/352 |
| 6,667,956 | B2 * | 12/2003 | Beshai et al. | 370/238 |
| 6,707,820 | B1 * | 3/2004 | Arndt et al. | 370/395.2 |
| 6,999,422 | B2 * | 2/2006 | Ishioka | 370/238 |
| 7,006,500 | B1 * | 2/2006 | Pedersen et al. | 370/394 |
| 7,590,756 | B2 * | 9/2009 | Chan | 709/238 |
| 7,623,455 | B2 * | 11/2009 | Hilla et al. | 370/232 |
| 7,710,869 | B1 * | 5/2010 | Gleichauf et al. | 370/229 |
| 7,839,860 | B2 * | 11/2010 | Kobayashi | 370/395.2 |
| 2002/0067693 | A1 * | 6/2002 | Kodialam et al. | 370/216 |
| 2005/0174935 | A1 | 8/2005 | Segel | |
| 2005/0249139 | A1 * | 11/2005 | Nesbit | 370/312 |
| 2006/0028991 | A1 * | 2/2006 | Tan et al. | 370/237 |
| 2006/0045011 | A1 * | 3/2006 | Aghvami et al. | 370/230 |
| 2006/0083239 | A1 * | 4/2006 | Kobayashi | 370/389 |
| 2006/0133282 | A1 * | 6/2006 | Ramasamy | 370/238 |
| 2006/0215689 | A1 | 9/2006 | Liu et al. | |
| 2008/0062873 | A1 * | 3/2008 | Semrad et al. | 370/232 |
| 2008/0130726 | A1 * | 6/2008 | Sofer et al. | 375/220 |
| 2008/0212613 | A1 * | 9/2008 | Perkinson et al. | 370/475 |
| 2008/0298246 | A1 * | 12/2008 | Hughes et al. | 370/236 |
| 2008/0298250 | A1 * | 12/2008 | Larsson | 370/238 |
| 2009/0010253 | A1 * | 1/2009 | Kobayashi | 370/389 |
| 2009/0238075 | A1 * | 9/2009 | Mosko | 370/238 |
| 2010/0070646 | A1 * | 3/2010 | Chan et al. | 709/231 |
| 2010/0272102 | A1 * | 10/2010 | Kobayashi | 370/389 |

* cited by examiner

*Primary Examiner* — Chi H Pham
*Assistant Examiner* — Robert Lopata
(74) *Attorney, Agent, or Firm* — Thomas R. Berthold

(57) ABSTRACT

A method for intelligently distributing packets of a data stream to multiple links of a network for simultaneous transmission via the multiple links, and for periodically re-allocating the distribution, achieves higher network throughput. The method has particular application for streaming audio-video traffic on a home local area network that has a source device, like a media server PC, and a destination device, like a digital TV. One of the links is assigned as the primary link (PL), and another link is assigned as a backup link (BL). Periodically a signal is sent from the source device over each link to the destination device and the round-trip travel time (RTT) for the signal and response for each link is measured. The RTT for a link is a good measure of the current end-to-end link status and generally will change during the time that the data stream is being transmitted as a result of certain events, such as traffic load and interference. The RTT on the PL (RTT-PL) and the RTT on the BL (RTT-BL) are used to adjust the allocation of packets simultaneously transmitted on the links.

18 Claims, 2 Drawing Sheets

METHOD FOR ALLOCATING DATA PACKET TRANSMISSION AMONG MULTIPLE LINKS OF A NETWORK, AND NETWORK DEVICE AND COMPUTER PROGRAM PRODUCT IMPLEMENTING THE METHOD

BACKGROUND OF THE INVENTION

1. Field of the Invention

This invention relates generally to networks, like home local area networks (LANs), that have multiple network links, and more particularly to a method for allocating transmission of the traffic stream packets among the multiple links.

2. Description of the Related Art

Local area networks (LANs) are becoming prevalent in the home, and are being used for applications that require high effective bandwidth or throughput, such as streaming audio and/or video (audio-video or "AV"). Also, the various network devices, such as a media server personal computer (PC) source device and a digital TV destination device, may be connected by more than one network link. These different network links may be wireless, like IEEE 802.11 links, or wired, like Ethernet and powerline communications (PLC) links. The throughput of each network link is limited and fluctuates with traffic load and interference, e.g., microwave ovens and other appliances powering on and off on the electrical wiring used by a PLC link. Also, AV applications, such as streaming high-definition TV (HDTV), require networks with higher maximum capacity bandwidth and more sustainable throughput. Thus an individual network link cannot always meet the throughput requirement of some applications, particularly streaming AV.

The conventional method for transmitting packets of a traffic stream over a network with multiple links is to select the link with the highest maximum capacity bandwidth and transmit all of the packets on that link. Another method is a "round-robin" method in which groups of packets are sent in succession to the different links for simultaneous transmission on all the links.

What is needed is a method in a multiple-link network for intelligently distributing or allocating traffic stream packets among multiple links and periodically adjusting the allocation so as to achieve higher network throughput.

SUMMARY OF THE INVENTION

The invention relates to a method for intelligently distributing packets of a data stream to multiple links of a network for simultaneous transmission via the multiple links, and for periodically re-allocating the distribution. The method has particular application for streaming AV traffic on a home LAN that has a source device, like a media server PC, and a destination device, like a digital TV. One of the links, for example the link with the greatest bandwidth, is assigned as the primary link (PL), and another link is assigned as a backup link (BL). Initially all of the packets are transmitted on the PL. Periodically a signal is sent from the source device over each link to the destination device and the round-trip travel time (RTT) for the signal and response for each link is measured. The RTT for a link is a good measure of the current end-to-end link status and generally will change during the time that the data stream is being transmitted as a result of certain events, such as traffic load and interference. The signal from the source device may be an Address Resolution Protocol (ARP) request and the response from the destination device may be the ARP reply. The RTT on the PL (RTT-PL) and the RTT on the BL (RTT-BL) are used to adjust the allocation of packets simultaneously transmitted on the links. If RTT-PL is greater than RTT-BL (plus some "margin" to assure the difference between RTT-PL and RTT-BL is significant), then this is an indication that the throughput on the PL has decreased and that throughput can be increased by simultaneously using the BL, so the number of packets transmitted on the PL is decreased and the number of packets transmitted on the BL is increased. Similarly, after a periodic measurement of the RTTs, if RTT-BL is greater than RTT-PL then the number of packets transmitted on the BL is decreased and the number of packets transmitted on the PL is increased. In the implementation of the method the proportion of the traffic stream allocated or assigned to each link can be represented by transmission (TX) tokens, with a fixed number of TX tokens allocated between the PL and BL. During the allocation and re-allocation of the packets, the total number of TX tokens remains the same, but the number of TX tokens assigned to the PL and BL will change following each periodic measurement of the RTTs.

The invention also relates to a source device, such as a media server PC, and a computer program product, both of which contain computer-executable program instructions that enable the source device to implement the method of the invention.

For a fuller understanding of the nature and advantages of the present invention, reference should be made to the following detailed description taken together with the accompanying figures.

DETAILED DESCRIPTION OF THE INVENTION

Home LANs may include consumer electronic (CE) devices like stereo receivers, digital video recorders (DVRs), digital versatile disc (DVD) players, and digital TVs, as well as personal computers (PCs) which may also serve as AV or media servers. Home LANs include both wireless local area networks (WLANs) and wired LANs. WLANs include those based on the well-known IEEE 802.11 or Wi-Fi standards, as well as ultrawideband (UWB) networks that have a fairly short range but very high throughput. Wired LANS include 10/100baseT Ethernet and alternating-current (AC) powerline communications (PLC) networks that use the existing electrical wiring in a home or single building. One type of PLC network is based on the HomePlug™ standard.

It is becoming increasingly common for home LANs to have more than one network link connecting various network devices. For example, various devices on the LAN may be connected by both a wireless IEEE 802.11 link and a PLC link. The LAN may also include personal area network (PAN) links, such as those based on the ZigBee™ and Bluetooth® standards, that interconnect various devices. The throughput of each network link is limited and fluctuates with traffic load and interference, e.g., microwave ovens and other appliances powering on and off on the electrical wiring used by a PLC link. Also, in home LANs new multimedia AV applications, such as streaming high-definition TV (HDTV), require networks with higher maximum capacity bandwidth and more sustainable network throughput. Thus an individual network link cannot always meet the throughput requirement of some applications, particularly streaming AV. As used herein in the context of a communications network, "throughput" means channel capacity, i.e., the amount of discrete information that can be reliably transmitted over a channel per unit of time. As used herein, "bandwidth" (BW) means the "effective" network bandwidth and is thus the same as "throughput", as opposed to the "maximum capacity" network bandwidth. Throughput or bandwidth is affected by other traffic streams, interference and other constraints and is thus typically less than the network's maximum capacity bandwidth.

Figure 1:
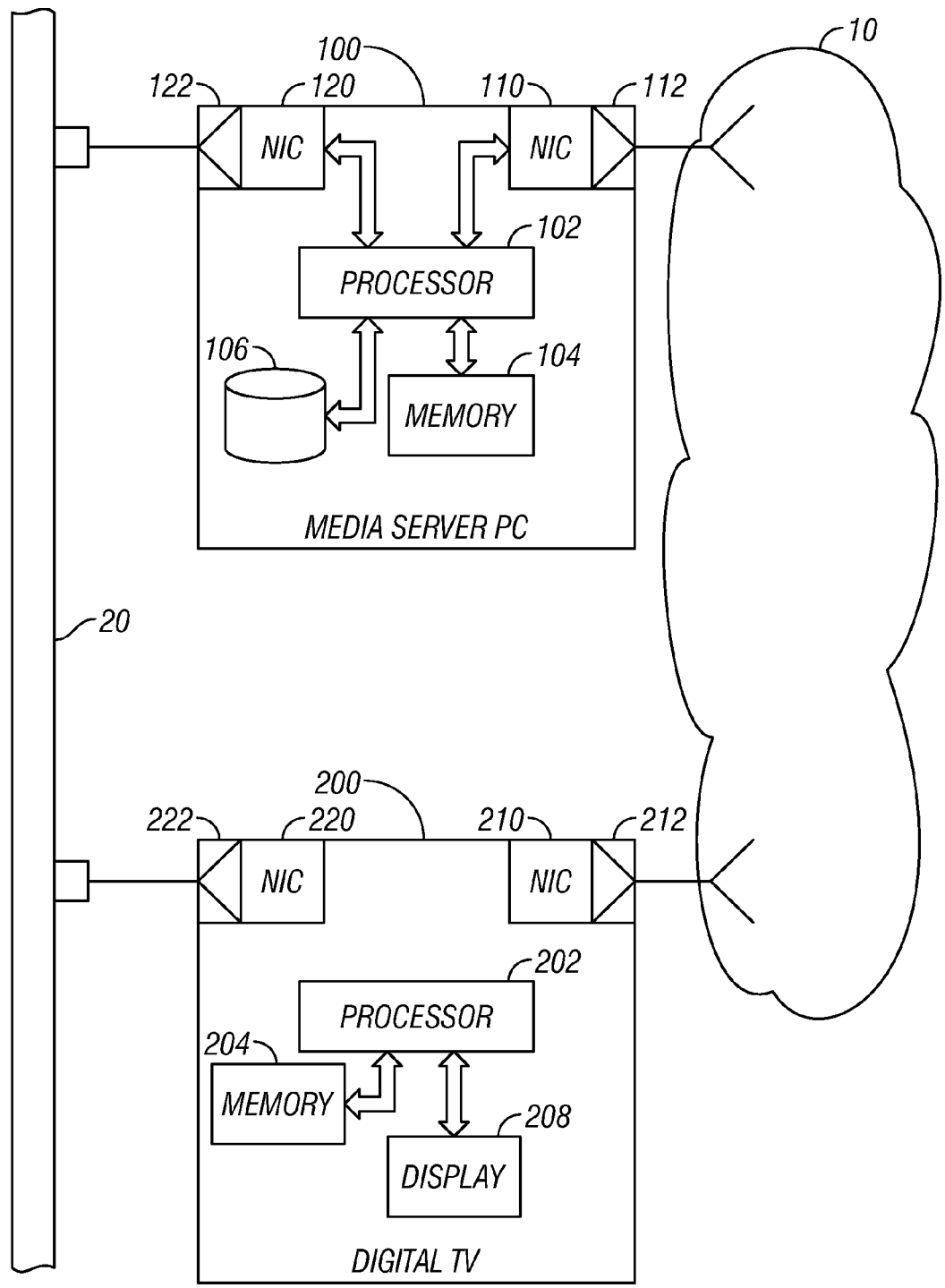
FIG. 1 is a block diagram of a LAN with a source device that transmits a data stream, a destination device that receives the data stream, and two network links connecting the source and destination devices.

While the invention is fully applicable to any multiple-link LAN and to the transmission of any type of data stream between the devices, it will be explained in the context of a home LAN with only two links and an AV stream. FIG. 1 shows an example of a LAN with a source device 100 that transmits a data stream, a destination device 200 that receives the data stream, and two network links 10, 20. In the example of FIG. 1, source device 100 is a Media Server PC, the destination device 200 is a digital TV, network link 10 is an IEEE 802.11 wireless link, the network link 20 is a Home-Plug™ PLC network link, and the data stream is an AV stream. The Media Server PC includes a microprocessor or digital processor 102 and associated memory 104, and a hard disk drive (HDD) 106. HDD 106 stores the media content, which may be stored in various audio and video file formats like JPEG, AVI, MPEG and MP3. The Media Server PC may also be connected to one or more other devices, such as a DVD player, digital video camcorder, or legacy video cassette recorder (VCR), any one of which may provide media content to the Media Server PC. The source device 100 may be any other type of network device that provides a data stream for transmission to a destination device. For example, the source device 100 may be a set-top box (STB) that receives a signal from an external source, typically a TV signal from a satellite dish or a cable TV provider via a coaxial cable.

The Media Server PC's processor 102 takes the media content on the HDD 106 and using a networking protocol like Transmission Control Protocol (TCP) or User Datagram Protocol (UDP) encapsulates the media content into internet protocol (IP) packets for transmission to the TV. The Media Server PC includes a network adapter, also called a network interface card (NIC) 110, that includes electronics for interfacing the Media Server PC with wireless network link 10. NIC 110 includes a transceiver 112 for transmitting and receiving on link 10. NIC 110 takes the IP packets and transmits them over link 10 using IEEE 802.11 protocols. The Media Server PC also includes a NIC 120 with transceiver 122 that interfaces the Media Server PC with PLC network link 20. NIC 120 takes the IP packets and transmits them over link 20 using HomePlug™ protocols. The digital TV (destination device 200) also includes a NIC 210 with transceiver 212 for IEEE 802.11 link 10 and a NIC 220 with transceiver 222 for PLC link 20. The digital TV, which also includes a processor 202 and associated memory 204, receives the IP packets and decodes the received digital information for rendering on the TV display 208.

The conventional method for transmitting the data packets from the source device 100 to the destination device 200 is to select the link with the highest maximum capacity network bandwidth and transmit 100% of the data packets on that link. For example, a PC with NICs for both an Ethernet link and a wireless link (which typically has a lower maximum capacity bandwidth than an Ethernet link) will select the Ethernet link even if the Ethernet link is heavily used and the wireless link is unused. The wireless link is then used only when the Ethernet cable is unplugged. Another method is a "round-robin" method in which the packets (typically groups of a fixed number N of packets) are alternately sent to the two transmitters for simultaneous transmission on both links to the destination device. The networking software, like the software for the TCP/IP protocol stack, typically includes a router function or algorithm that performs this round-robin allocation of the IP packets in the source device and a re-ordering function or algorithm in the destination device that reorders the IP packets as they are received from the two links.

Figure 2:
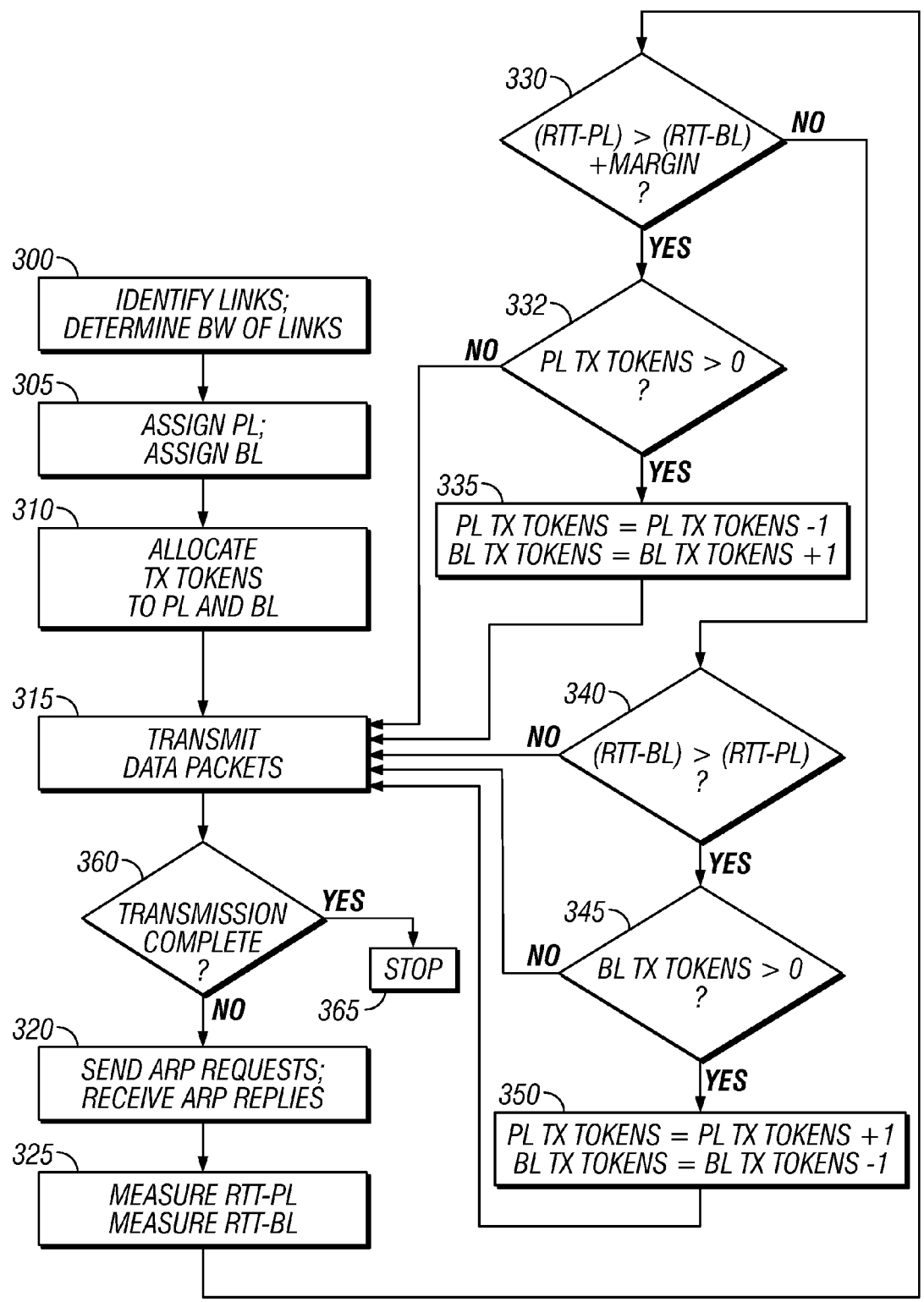
FIG. 2 is a flow chart illustrating a link bonding method for intelligently allocating data packets of a traffic stream among multiple network links according to this invention.

This invention relates to a link bonding method that achieves higher network throughput by allocating the data packets intelligently among multiple network links and adjusting the allocation periodically. FIG. 2 is a flow chart of the method.

First, in block 300, the source device identifies all network links that connect the source device and the destination device and determines the BW of each link. This is typically accomplished by the destination device supplying the source device with the list of IP addresses of the destination device at the time the AV content is selected for delivery and display. The source device can then inspect its routing table to determine which physical links are capable of delivering transmitted packets to the destination device. The routing table is populated when a physical interface is enabled and assigned its IP address and subnet mask. There may be more than two network links connecting the source device to the destination device.

Next, in block 305, the source device assigns one of the links as a primary link (PL) and another as a backup link (BL). In the preferred method, the assignment is made so that the PL has a greater BW than the BL. The assignment may also be made by selecting as the PL the network link that has the greater maximum capacity bandwidth.

Next in block 310, a fixed number of transmission (TX) tokens are allocated between the PL and BL. A TX token merely represents the proportion of the traffic stream allocated or assigned to that link. In the preferred method, initially all of the data packets are assigned for transmission on the PL, so for example, 100 TX tokens would be assigned to the PL and 0 TX tokens assigned to the BL. Next, at block 315, transmission of the traffic stream thus begins with all of the data packets being transmitted on the PL. If all of the data packets have been transmitted (YES at block 360), then the traffic stream has been completed and the process is finished (block 365). If there are data packets remaining to be transmitted in the traffic stream (NO at block 360), then the method moves to block 320.

At block 320 the source device sends a signal to the destination device on each link and receives a return signal from the destination device on each link, and at block 325 measures the roundtrip travel time (RTT) for the primary link (RTT-PL) and the backup link (RTT-BL). The RTT for a link is a good measure of the current end-to-end link status and generally will change during the time that the AV data stream is being transmitted. For example, the RTT will be affected by events such as other network devices begin use of the link, an interfering radio source causes reduced BW on the radio channel used by an IEEE 802.11 link, an intermediate bridge device becomes congested and is not able to deliver the AV stream at the desired data rate, or the signal-to-noise ratio at the PLC receiver is reduced due to wideband noise being introduced onto the home AC power circuit by various AC devices such as power converters, refrigerators, and lighting systems.

In the preferred method the signal sent from the source device is an Address Resolution Protocol (ARP) request and the return signal from the destination device is an ARP reply.

The ARP is the standard method for finding a device's hardware address when only its network layer address is known. The ARP can be used when two devices are on the same local network and can directly communicate and one device desires to send a data packet to the other. ARP is primarily used to translate an IP address to a Media Access Control (MAC) address. A MAC address is a quasi-unique identifier attached to most NICs and is a number that acts like a name for a particular NIC. Thus, referring to FIG. 1, NIC 110 in the Media Server PC transmits an ARP request on IEEE 802.11 link 10 to NIC 210 in the digital TV and NIC 210 then transmits an ARP reply back to NIC 110. Similarly, NIC 120 in the Media Server PC transmits an ARP request on PLC link 20 to NIC 220 in the digital TV and NIC 220 then transmits an ARP reply back to NIC 120. Then at block 325, the processor 102 measures or calculates RTT-PL and RTT-BL from knowledge of the times of transmission of the ARP request and receipt of the ARP reply for each link.

The RTT-PL and RTT-BL are used to adjust the allocation of TX tokens. RTT-PL and RTT-BL are compared at block 330. If RTT-PL is greater than RTT-BL plus a Margin (YES at block 330), then this is an indication that the throughput on the PL has decreased and that throughput can be increased by simultaneously using the BL. The Margin is some predetermined value, for example 10% of RTT-BL, to assure there is some substantial difference between RTT-PL and RTT-BL to warrant use of the BL. If RTT-PL is greater than RTT-BL plus a Margin (YES at block 330) then at block 332 the PL TX token value is checked to determine if it is greater than zero. If it is not (NO at block 332) then there are no PL TX tokens, and this indicates that all of the data packets are already being transmitted on the BL, and transmission then continues (block 315). If the PL TX token value is greater than zero (YES at block 332), then this indicates that some portion of the data packets is currently being sent over the PL. So there is then a re-allocation of the TX tokens at block 335. For example, one of the PL's TX tokens is assigned to the BL so that the number of PL TX tokens is now 99 and the number of BL TX tokens is 1. This means that 99% of the packets will be transmitted on the PL and 1% of the packets on the BL. More specifically, for each successive group of a predetermined number N of packets in the traffic stream, 99 would be transmitted on the PL and 1 on the BL. The value of N can be preselected by the Media Server PC (source device 100 in FIG. 1). However, if the AV traffic stream originates from HDD 106 (FIG. 1) then the value of N may be based on the size of the HDD's internal buffers. If the AV traffic stream is from a device external to the Media Server PC, then N may be selected to be large enough to mask any processing delays in the device, but kept as small as possible to minimize the delay introduced by the device.

The number of TX tokens re-allocated at block 335 may be some number other than 1, which is used here as just one example. For example, if the fixed number of TX tokens is 100 and it is desired that 5% of the data packets should be transmitted on the BL if the test at block 330 is met, then 5 TX tokens would be re-assigned from the PL to the BL each time the test at block 330 is met. After re-allocation of the TX tokens at block 335, the simultaneous transmission of data packets on the Pl and BL continues with the data packets being distributed between the PL and the BL according to the new allocation (block 315).

If at block 330, RTT-PL is less than RTT-BL plus the Margin (NO at block 330), then a test is made at block 340 to determine if RTT-BL is greater than RTT-PL. If it is and if at block 345 the number of BL's TX tokens is greater than zero (block 345), then at block 350 there is a re-allocation of TX tokens by decreasing the BL TX tokens by 1 and increasing the PL TX tokens by 1. The transmission then continues (block 315) with the data packets being distributed according to the new allocation of TX tokens from block 350. If at block 340 RTT-BL is not greater than RTT-PL, then there is no re-allocation of TX tokens and transmission of the data packets continues (block 315) according to the current allocation. If at block 345 there are no BL TX tokens (NO at block 345), then this indicates that all of the data packets are already being transmitted on the PL, and transmission then continues (block 315).

So long as there are data packets remaining to be transmitted (NO at block 360), the ARP requests are again sent and the ARP replies again received (block 320). So long as the transmission continues, the RTT-PL and RTT-BL are periodically measured and compared in this manner to re-allocate the data packets for simultaneous transmission between the two links. The rate at which the RTT-PL and RTT-BL are periodically measured and compared during transmission of the data stream can be pre-selected. For example, the frequency of sending the ARP requests can be based on a timer or some other method that is independent of the AV stream. Alternatively, the time between ARP requests can be based on N, for example some multiple of N. However, the frequency of ARP requests should be kept small enough to not add to the load on the network links and so that the processing time to measure RTT-PL and RTT-BL does make the transmission of the data packets unacceptably slow.

The flow chart of FIG. 2 represents an algorithm that is implemented in software modules or components of executable code located within memory 104 of the source device 100. The source device 100 includes a computer, e.g., processor 102 in the Media Server PC, that performs logical and arithmetic operations based on the program instructions stored in memory 104, and is thus capable of performing the functions represented in the flow chart of FIG. 2. These computer program instructions may also be stored on removable media readable by the computer in source device 100, such as a compact disc (CD), so that the invention is also a computer program product that contains computer-executable program instructions that enable the source device to implement the method of this invention.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for distributing packets of a data stream in a network having at least two network links, each link connecting a source device to a destination device, the method comprising:
   assigning one of said links as a primary link and another of said links as a backup link;
   transmitting data stream packets from the source device to the destination device on the primary link using a first set of communications protocols associated with said primary network link;
   transmitting a signal from the source device to the destination device on each link and receiving at the source device a return signal from the destination device on each link; and if the roundtrip time for said signal and return signal on the primary link (RTT-PL) is greater than the roundtrip time for said signal and return signal on the backup link (RTT-BL), then transmitting a portion of the data stream packets from the source device to the destination device on the backup link using a second set of communications protocols associated with said backup network link, said second set of protocols being different from said first set of protocols.

2. The method of claim 1 wherein each of said links possesses bandwidth and wherein assigning one of said links as a primary link and another of said links as a backup link comprises determining the bandwidth of each link and selecting the primary link to have a greater bandwidth than the backup link.

3. The method of claim 1 wherein transmitting a portion of the data stream packets on the backup link comprises transmitting said portion on the backup link only if RTT-PL is greater than RTT-BL by a predetermined margin.

4. The method of claim 1 wherein transmitting a signal from the source device and receiving a return signal at the source device comprises periodically transmitting said signal and receiving said return signal, and wherein transmitting a portion of the data stream packets on the backup link comprises increasing the portion transmitted on the backup link if the RTT-PL is greater than RTT-BL after each periodic signal transmission and return signal receipt.

5. The method of claim 4 further comprising decreasing the portion transmitted on the backup link if the RTT-PL is less than RTT-BL after each periodic signal transmission and return signal receipt.

6. The method of claim 1 wherein transmitting a signal from the source device to the destination device comprises transmitting an Address Resolution Protocol (ARP) request, and wherein receiving at the source device a return signal from the destination device comprises receiving an ARP reply.

7. The method of claim 1 wherein one of the network links is a powerline communications (PLC) network link.

8. The method of claim 1 wherein one of the network links is a wireless network link.

9. The method of claim 1 wherein the source device is one of a set-top box and a media server, the destination device is a television (TV), and the data stream is an audio-video (AV) stream.

10. A source device capable of transmitting an audio-video (AV) data stream of data packets on a network when the source device is connected to a network that includes a destination device capable of receiving an AV data stream, the source device comprising:

first adapter electronics for interfacing with a wireless network link;

second adapter electronics for interfacing with a wired network link;

a processor;

memory accessible by the processor; and computer program instructions in the memory and readable by the processor for performing processor-implemented steps when the source device is connected to a destination device via said wireless link and to said destination device via said wired link independent of said wireless link, the steps comprising:

(a) assigning one of said links as a primary link (PL) and the other of said links as a backup link (BL);

(b) transmitting all of the packets of the AV data stream from the source device via the adapter electronics interfaced with the PL;

(c) periodically transmitting a signal to the destination device via each link and receiving at the source device a return signal from the destination device via each link;

(d) periodically measuring the roundtrip time for said signal and return signal on the PL (RTT-PL) and the roundtrip time for said signal and return signal on the BL link (RTT-BL);

(e) if RTT-PL is greater than RTT-BL after a periodic measurement, decreasing the number of packets transmitted from the source device via the adapter electronics interfaced with the PL and increasing the number of packets transmitted from the source device via the adapter electronics interfaced with the BL; and (f) if RTT-PL is less than RTT-BL after a periodic measurement, decreasing the number of packets transmitted from the source device via the adapter electronics interfaced with the BL and increasing the number of packets transmitted from the source device via the adapter electronics interfaced with the PL.

11. The source device of claim 10 wherein the instructions for performing the step of assigning one of said links as the PL and the other of said links as the BL comprises instructions for determining the bandwidth of each link and selecting as the PL the link having the greater bandwidth.

12. The source device of claim 10 wherein the instructions for performing the step of decreasing the number of packets transmitted from the source device via the adapter electronics interfaced with the PL if RTT-PL is greater than RTT-BL comprises instructions for decreasing the number of packets transmitted from the source device via the adapter electronics interfaced with the PL only if RTT-PL is greater than RTT-BL by a predetermined margin.

13. The source device of claim 10 wherein the instructions for performing the step of transmitting a signal to the destination device via each link and receiving at the source device a return signal from the destination device via each link comprises instructions for transmitting an Address Resolution Protocol (ARP) request and receiving an ARP reply.

14. The source device of claim 10 wherein the source device is one of a set-top box and a media server.

15. A computer program product for implementing a method of transmitting packets of an audio-video (AV) data stream from a source device to a destination device on a network across at least two network links, each link having unique communication protocols, wherein the method is capable of being performed by a computer incorporated in the source device, the computer program product comprising a non-transitory computer-readable medium having computer-executable instructions recorded thereon for implementing the method, the computer-executable instructions comprising:

(a) identifying the links connecting the source device and destination device;

(a) assigning one of said links as a primary link (PL) and another of said links as a backup link (BL);

(b) causing transmission of all of the packets of the AV data stream from the source device via the PL using the protocols associated with the PL;

(c) periodically causing transmission of a signal to the destination device via each link and receipt of a return signal from the destination device via each link;

(d) periodically measuring the roundtrip time for said signal and return signal on the PL (RTT-PL) and the roundtrip time for said signal and return signal on the BL link (RTT-BL);

(e) if RTT-PL is greater than RTT-BL after a periodic measurement, decreasing the number of packets to be transmitted from the source device via the PL and increasing the number of packets to be transmitted from the source device via the BL using the protocols associated with the BL; and (f) if RTT-PL is less than RTT-BL after a periodic measurement, decreasing the number of packets to be transmitted from the source device via the BL using the protocols associated with the BL and increasing the number of packets to be transmitted from the source device via the PL using the protocols associated with the PL.

16. The computer program product of claim 15 wherein the instructions for assigning one of said links as the PL and another of said links as the BL comprises instructions for determining the bandwidth of each link and selecting as the PL the link having the greater bandwidth.

17. The computer program product of claim 15 wherein the instructions for decreasing the number of packets transmitted from the source device via the PL if RTT-PL is greater than RTT-BL comprises instructions for decreasing the number of packets transmitted from the source device via the PL only if RTT-PL is greater than RTT-BL by a predetermined margin.

18. The computer program product of claim 15 wherein the instructions for causing transmission of a signal to the destination device via each link and receipt of a return signal from the destination device via each link comprises instructions for causing transmission of an Address Resolution Protocol (ARP) request and receipt of an ARP reply.

* * * * *